Apr. 3, 1923.
S. H. MORTENSEN
1,450,902
DYNAMO ELECTRIC MACHINE
Filed Dec. 3, 1920
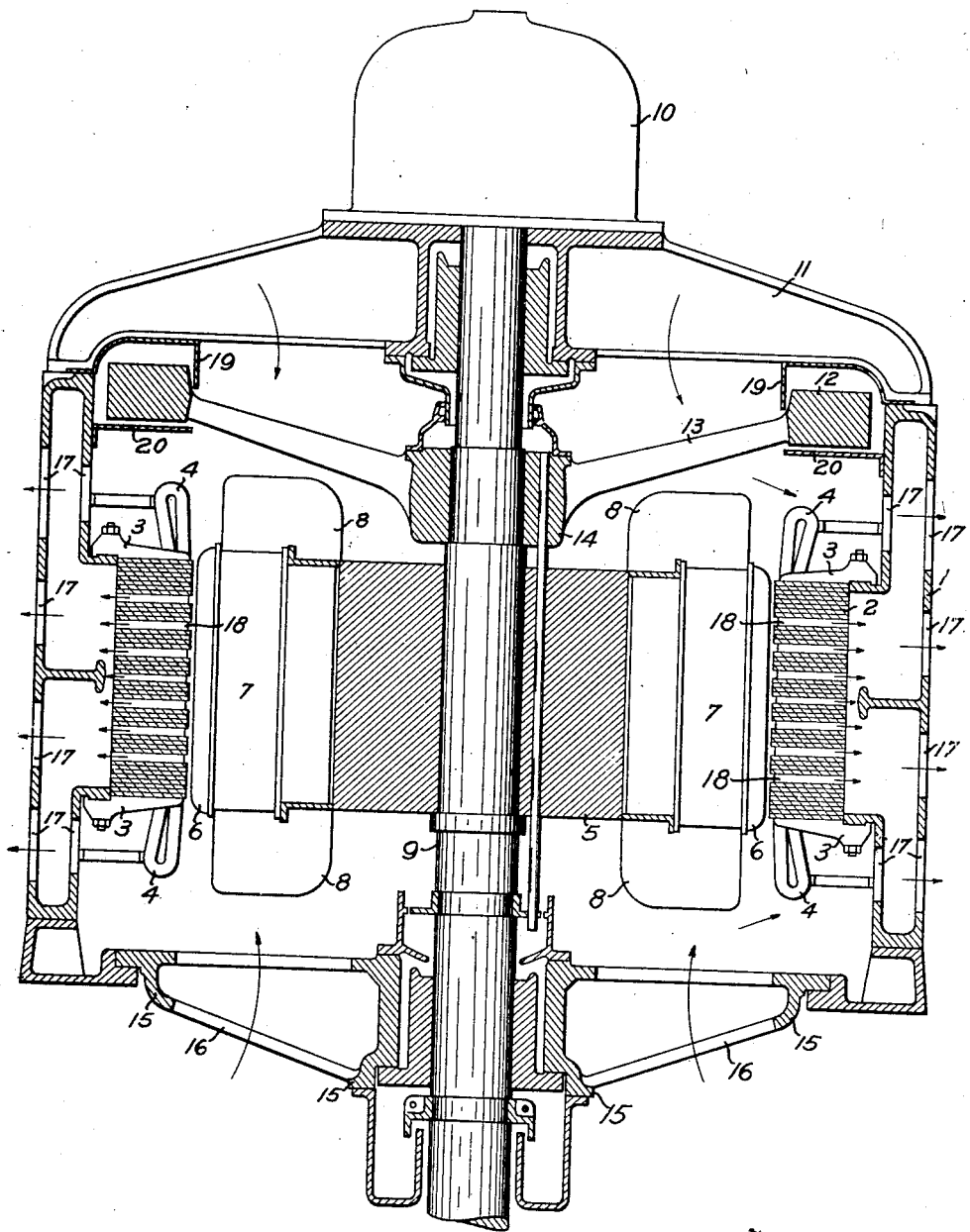
Inventor
S. H. Mortensen
by
Attorney Patented Apr. 3, 1923.

1,450,902

UNITED STATES PATENT OFFICE.

SOREN H. MORTENSEN, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

DYNAMO-ELECTRIC MACHINE.

Application filed December 3, 1920. Serial No. 427,981.

*To all whom it may concern:*

Be it known that SOREN H. MORTENSEN, a citizen of the United States, residing at Milwaukee, in the county of Milwaukee and State of Wisconsin, has invented a certain new and useful Improvement in Dynamo-Electric Machines, of which the following is a specification.

This invention relates in general to dynamo-electric machines. In such machines, particularly water-wheel driven generators, it sometimes occurs that the weight of the rotating parts is not sufficient to secure satisfactory governing characteristics in which case it becomes desirable to add a flywheel to the rotor of the machine. It is one of the objects of this invention to provide a structure in which a flywheel is so disposed that a maximum moment of inertia will be obtained with the use of a minimum amount of metal. It is a further object of this invention to provide a machine of the type mentioned in which the flywheel is so disposed that the ventilation thereof will not be interfered with, while at the same time satisfying the above noted requirements.

Other objects will appear hereinafter as the description of the invention proceeds. The novel features of the invention will appear from this specification and the accompanying drawing forming a part thereof and disclosing one embodiment of said invention, and all these novel features are intended to be pointed out in the claims.

The single figure of the drawing illustrates a vertical sectional view of a dynamo-electric machine embodying the features of the invention.

The machine shown on the drawing is provided with a stator comprising a yoke 1 for supporting a core 2. The core may be attached to the yoke in any suitable manner as by means of the end plates 3. The core is provided with the usual slots (not shown) in which are disposed the conductors of the armature winding the end-turns 4 of which are visible in the drawing.

The machine is provided with a rotor 5 including a pole piece 6 energized by the winding 7. It is understood that any desired number of pole pieces are provided. The rotor also carries any desired number of fan blades 8. The rotor is carried on shaft 9 supported by a thrust bearing 10 which is in turn supported by a bridge 11 here shown as resting on the yoke.

A flywheel having a rim 12 is associated with the rotor, said flywheel being here shown as having spokes 13 extending from a hub 14 keyed to the shaft 9 in any suitable manner.

The shaft 9 is also provided at its lower end with a guide-bearing supported by the member 15. This guide bearing support may be provided with openings 16 permitting passage of ventilating fluid.

The yoke and core are also provided with ventilating openings 17 and 18, respectively.

Disposed in proximity to the rim of the flywheel are baffles 19 and 20 which form a housing in which the rim rotates so that the air resistance may be reduced. If desired the entire flywheel may be enclosed.

In the embodiment of the invention disclosed, air for ventilating the rotor and stator-parts of the machine is taken both from below and above, whereas, if the flywheel is enclosed air would be taken in from below only. The air entering from below, as indicated by the arrows, has free passage through the openings in the guide-bearing support and part of it may go from there into the spaces between the fan blades and the pole pieces cooling these latter elements, and from there outwardly through the ventilating passages in the core and from thence out of the openings in the yoke. Another portion of the air passes along and around the end-turns and is blown out through openings in the yoke without passing through the core. Air entering the machine from above passes downwardly and between the spokes of the flywheel and from there part of it goes to ventilate the pole pieces and the core and part of it to ventilate the end-turns as already explained in connection with the lower part of the machine.

It will be noted that the disposition of the flywheel including the relation of the rim thereof to the rotor core and inner periphery of the yoke provides for as free ventilating passages as are provided for in the lower part of the machine. The flywheel may moreover be readily removed without disassembling the stator.

It should be understood that it is not desired to limit the invention claimed to the exact details of construction herein shown and described, for obvious modifications may occur to a person skilled in the art.

It is claimed and desired to secure by Letters Patent.

1. In a dynamo-electric machine of the vertical type, a stator, a rotor, a flywheel associated with said rotor and disposed above the same and within said stator so as to leave a ventilating passage within the rim of said flywheel, of substantially the same diameter as the rotor.

2. In a dynamo-electric machine of the vertical type, a stator including a core, a rotor, a flywheel associated with said rotor and so disposed above the same and within said stator as to leave a ventilating passage to said rotor within the rim of the flywheel, and another passage between said rim and the core.

3. In a dynamo-electric machine, a stator including a core, a rotor, a flywheel associated with said rotor and within said stator said flywheel having an outside diameter greater than the inner diameter of said core and being disposed above said core.

4. In a dynamo-electric machine, a stator comprising a yoke and core, the inner diameter of said core being less than the inner diameter of said yoke, a rotor, a shaft for said rotor, a bearing for said shaft supported by said stator, a fly wheel carried by said shaft and disposed between said bearing and rotor, said fly wheel having an outer diameter greater than the inner diameter of said core and less than the inner diameter of said yoke.

5. In a dynamo-electric machine, a stator, a rotor, a fly wheel associated with said rotor and disposed within said stator, said fly wheel having a ventilating passage therethrough.

6. In a dynamo-electric machine, a stator including a core and yoke therefor, a rotor, a fly wheel associated with said rotor and disposed within said yoke so as to leave a ventilating passage between said wheel and said core.

7. In a dynamo-electric machine of the vertical type, a horizontal support, a stator, including a core, resting on the said support, a rotor, a shaft for said rotor passing through said support, a fly wheel associated with said rotor and within said stator, said fly wheel having an outside diameter greater than the inner diameter of said core and being disposed above said core.

8. In a dynamo-electric machine of the vertical type, a horizontal support, a stator, comprising a yoke and core, resting on said support, the inner diameter of said core being less than the inner diameter of said yoke, a rotor, a shaft for said rotor passing through said support, a fly wheel associated with said rotor having an outer diameter greater than the inner diameter of said core and less than the inner diameter of said yoke, said fly wheel being disposed above said rotor and core.

9. In a dynamo-electric machine, a stator comprising a yoke and core, the inner diameter of said core being less than the inner diameter of said yoke, a rotor, a fly wheel associated with said rotor said fly wheel having an outer diameter greater than the inner diameter of said core and less than the inner diameter of said yoke, said fly wheel being spaced from said core, and fan-means carried by said rotor for drawing air through said fly wheel and into the space between the fly wheel and core.

In testimony whereof, the signature of the inventor is affixed hereto.

SOREN H. MORTENSEN.